United States Patent
Saito et al.

(10) Patent No.: US 12,476,418 B2
(45) Date of Patent: Nov. 18, 2025

(54) CONNECTOR

(71) Applicant: YAZAKI CORPORATION, Tokyo (JP)

(72) Inventors: Akihiro Saito, Kakegawa (JP); Shinsuke Aoshima, Fujieda (JP); Koudai Yamamoto, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 299 days.

(21) Appl. No.: 18/491,722

(22) Filed: Oct. 20, 2023

(65) Prior Publication Data

US 2024/0154355 A1  May 9, 2024

(30) Foreign Application Priority Data

Nov. 7, 2022  (JP) ................. 2022-178411

(51) Int. Cl.
*H01R 13/58* (2006.01)
*H01R 13/502* (2006.01)
*B60L 53/16* (2019.01)

(52) U.S. Cl.
CPC ......... *H01R 13/582* (2013.01); *H01R 13/502* (2013.01); *B60L 53/16* (2019.02); *H01R 2201/26* (2013.01)

(58) Field of Classification Search
CPC ............. H01R 13/582; H01R 13/502; H01R 2201/26; H01R 13/506; H01R 13/40; H01R 13/58; B60L 53/16
See application file for complete search history.

(56) References Cited

U.S. PATENT DOCUMENTS

| | | | |
|---|---|---|---|
| 9,531,100 B2 * | 12/2016 | Fukushima | H01R 13/08 |
| 10,243,298 B2 * | 3/2019 | Kawai | H01R 12/65 |
| 2016/0126681 A1 | 5/2016 | Kawai et al. | |
| 2018/0043848 A1 * | 2/2018 | Kawai | H01R 13/447 |
| 2018/0048090 A1 * | 2/2018 | Kawai | H01R 13/5829 |
| 2018/0048091 A1 * | 2/2018 | Kawai | H01R 12/65 |
| 2019/0199040 A1 * | 6/2019 | Tanizaki | H01R 13/6683 |

(Continued)

FOREIGN PATENT DOCUMENTS

| | | |
|---|---|---|
| JP | 2014-7004 A | 1/2014 |
| JP | 2015-8099 A | 1/2015 |
| JP | 2018-133278 A | 8/2018 |

*Primary Examiner* — Abdullah A Riyami
*Assistant Examiner* — Nader J Alhawamdeh
(74) *Attorney, Agent, or Firm* — KENEALY VAIDYA LLP (57) ABSTRACT

A charging inlet includes a rear holder installed to a housing and supporting electric wires connected to the terminals accommodated in the terminal accommodating chambers. The rear holder includes an inner rear holder and an outer rear holder. In an outer peripheral portion of the inner rear holder, a plurality of outer electric wire insertion portions each having an inner electric wire support surface is provided. In an inner peripheral portion of the outer rear holder, a plurality of inner electric wire insertion portions each having an outer electric wire support surface. The plurality of inner electric wire insertion portions communicates with an outer peripheral side of the outer rear holder through a communication portion. The electric wires are sandwiched between the inner electric wire support surfaces and the outer electric wire support surfaces.

3 Claims, 11 Drawing Sheets

(56) References Cited

U.S. PATENT DOCUMENTS

| | | | |
|---|---|---|---|
| 2024/0022015 A1* | 1/2024 | Ohmura | H01R 13/6397 |
| 2024/0154350 A1* | 5/2024 | Yamaguchi | H01R 13/533 |
| 2024/0154355 A1* | 5/2024 | Saito | H01R 13/582 |
| 2024/0195121 A1* | 6/2024 | Yamaguchi | H01R 13/521 |
| 2024/0372294 A1* | 11/2024 | Iwami | H01R 13/2471 |
| 2024/0372304 A1* | 11/2024 | Iwami | B60L 53/16 |
| 2025/0202170 A1* | 6/2025 | Aoki | B60L 53/16 |

* cited by examiner

CONNECTOR

CROSS-REFERENCE TO RELATED APPLICATIONS

This application is based on and claims priority under 35 USC 119 from Japanese Patent Application No. 2022-178411 filed on Nov. 7, 2022, the contents of which are incorporated herein by reference.

TECHNICAL FIELD

The present invention relates to a connector.

BACKGROUND ART

There is known a connector including a holder (rear holder) that is assembled to a housing and supports electric wires connected to terminals accommodated in the housing (see Patent Literature 1 and the like). The holder includes a first holder having a locking portion, and a second holder that holds the electric wires with the first holder by locking a locked portion to the locking portion.

CITATION LIST

Patent Literature

Patent Literature 1: JP2015-8099A

SUMMARY OF INVENTION

However, in the connector disclosed in Patent Literature 1, the holder that is installed in the housing and supports the electric wires connected to the terminals is divided into the first holder and the second holder, and a gap is generated between the electric wires and the holder when the first holder and the second holder are installed in the housing. For this reason, when an external force is applied to the electric wires, the electric wires are shaken in the gap. Therefore, the terminals connected to ends of the electric wires are also shaken in conjunction, which may affect the alignment of top ends of the terminals.

The connector in which the alignment of the top ends of the terminals is affected may have a poor fitting workability with a counterpart connector.

The present invention is made in view of the above circumstances, and an object of the present invention is to provide a connector that can prevent shaking of top ends of terminals accommodated in a housing and improve the alignment.

To achieve the above object, the connector according to the present invention has the following features.

According to the connector of the present invention, shaking of top ends of terminals accommodated in a housing can be prevented and the alignment can be improved.

The present invention is briefly described above. Details of the present invention can be clarified by reading modes for carrying out the invention (hereinafter, referred to as "embodiments") described below with reference to the accompanying drawings.

DESCRIPTION OF EMBODIMENTS

A specific embodiment of the present invention will be described below with reference to the drawings.

Figure 1:
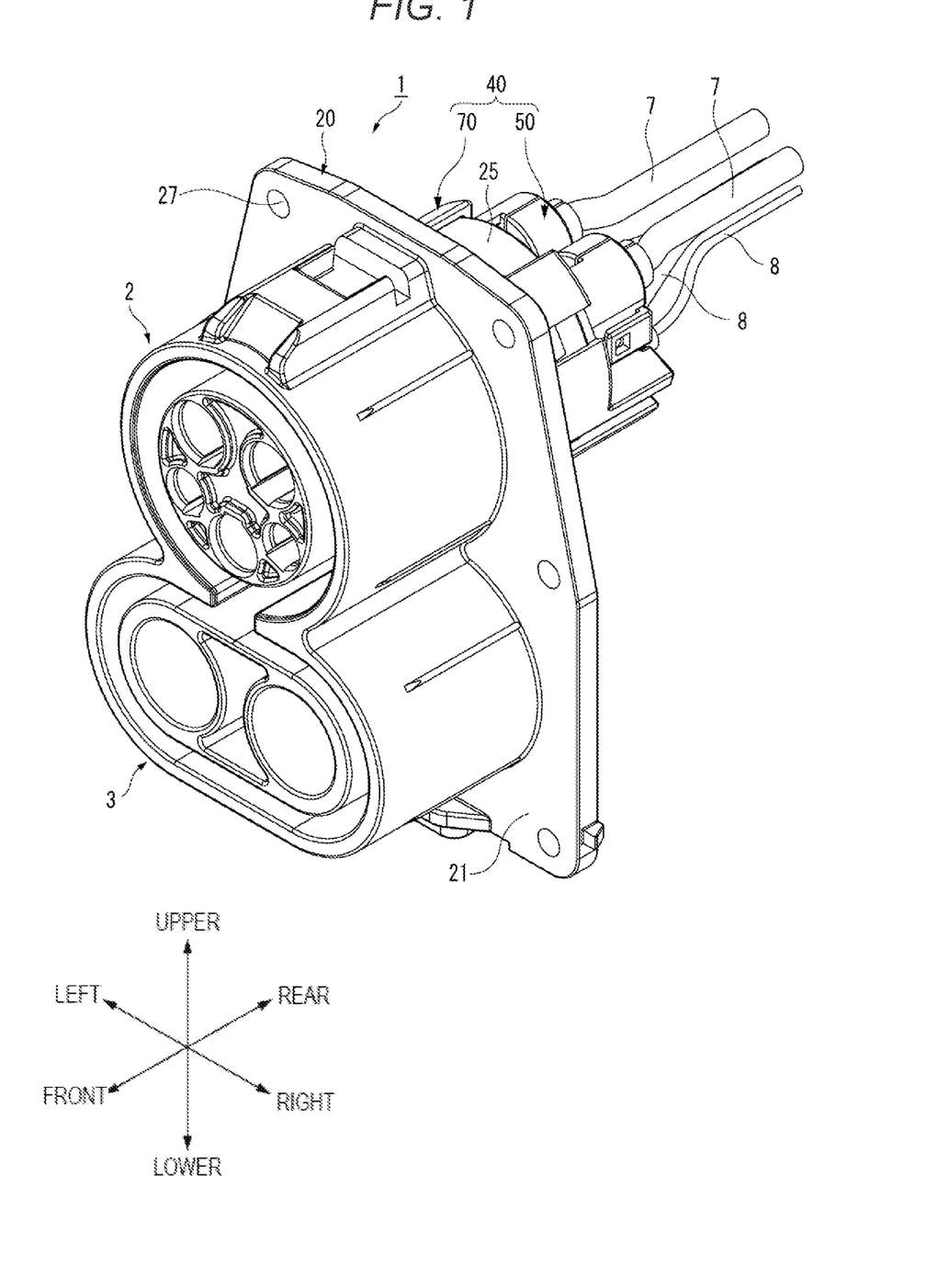
FIG. 1 is a perspective view of a main portion of a connector according to an embodiment of the present invention viewed from a front side.
Figure 2:
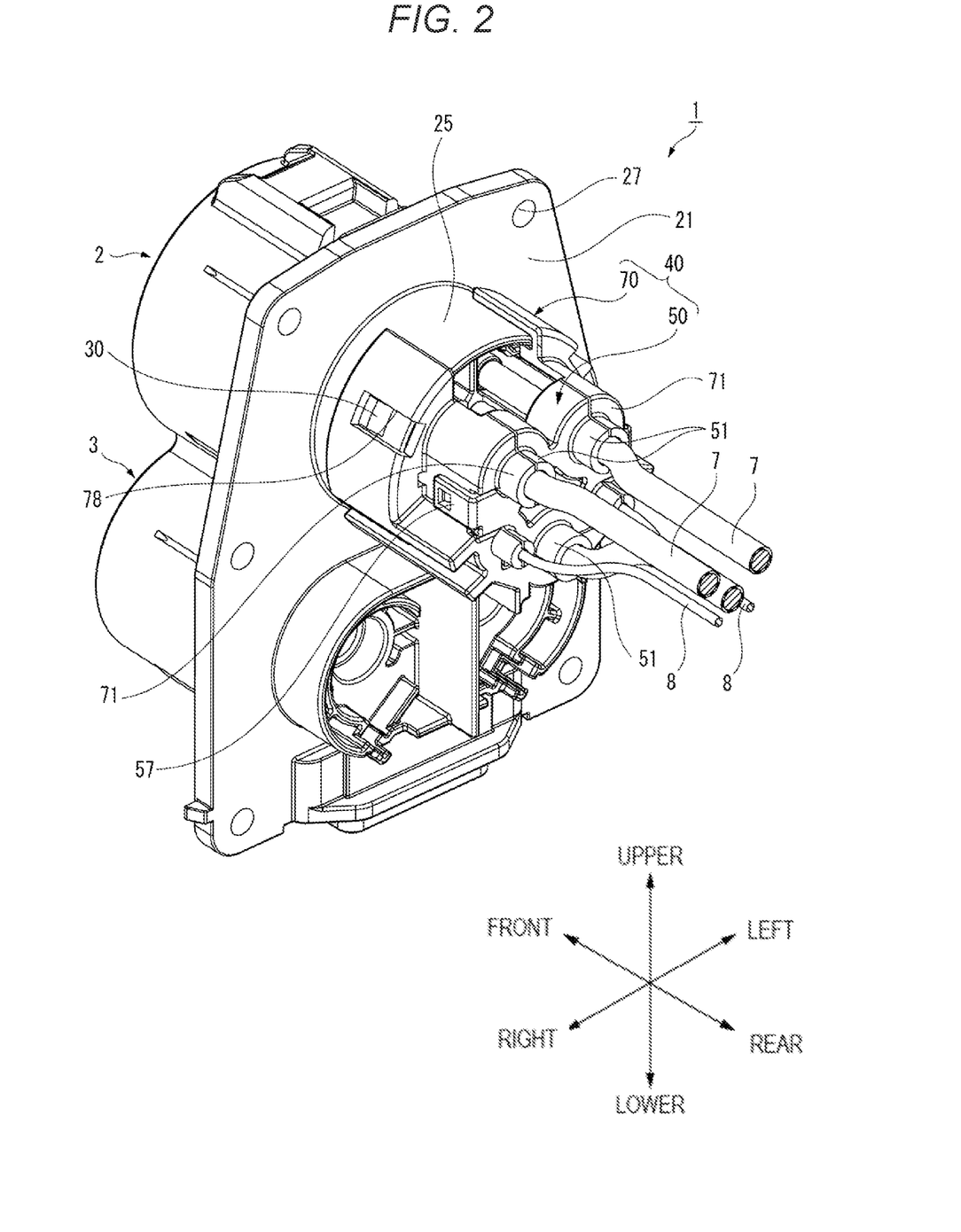
FIG. 2 is a perspective view of the main portion of the connector in FIG. 1 viewed from a rear side.
Figure 3:
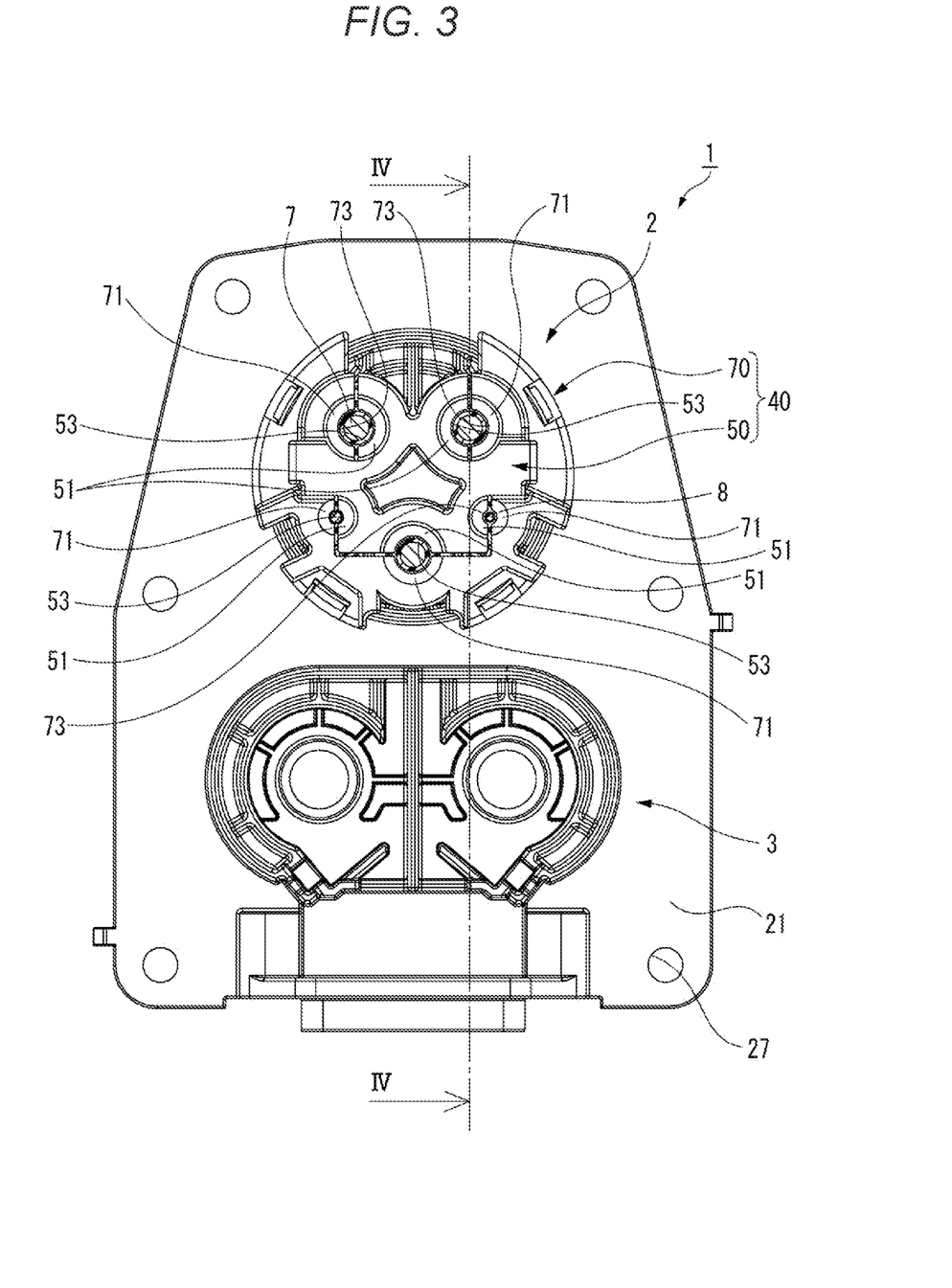
FIG. 3 is a front view of the main portion of the connector in FIG. 1.
Figure 4:
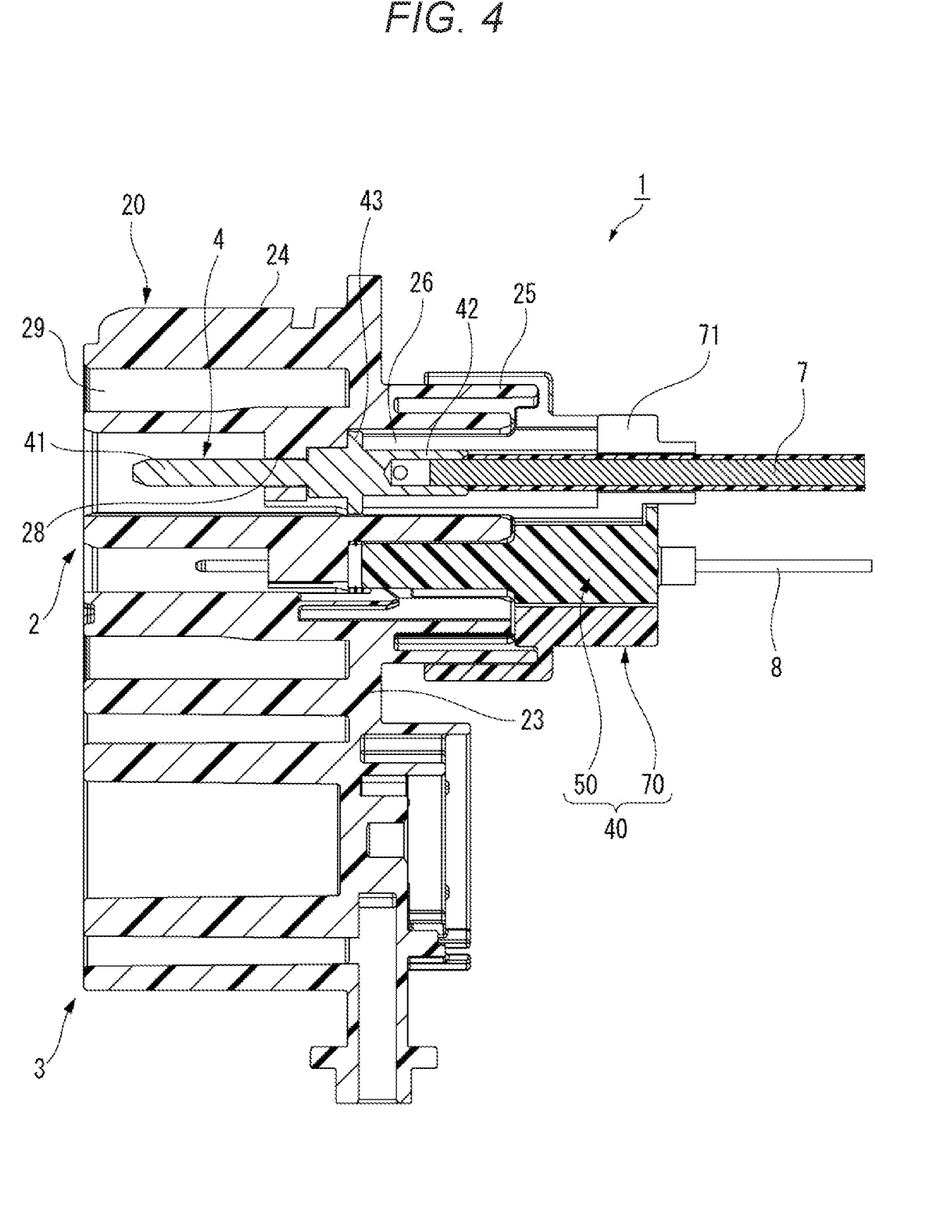
FIG. 4 is a cross-sectional view taken along a line IV-IV in FIG. 3.
Figure 5:
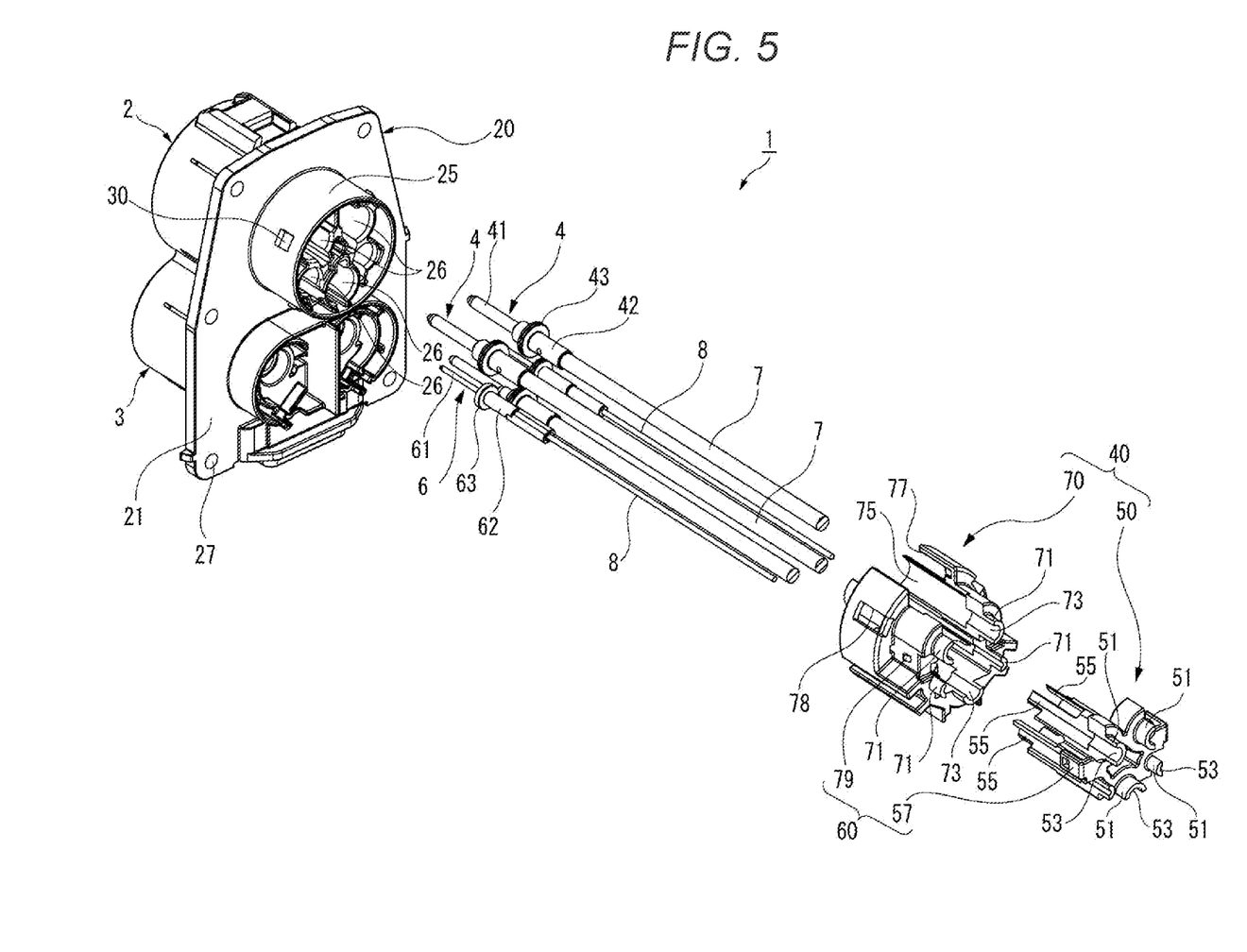
FIG. 5 is an exploded perspective view of the main portion of the connector in FIG. 1.

FIGS. 1 and 2 are perspective views viewed from a front side and a rear side of a charging inlet 1 according to the embodiment of the present invention. FIG. 3 is a front view of the charging inlet 1 in FIG. 1. FIG. 4 is a cross-sectional view taken along a line IV-IV of FIG. 3. FIG. 5 is an exploded perspective view of a main portion of the charging inlet 1 in FIG. 1. In the present specification, a front-rear direction, an upper-lower direction, and a left-right direction follow directions of arrows in FIGS. 1 and 2.

The charging inlet 1 in FIGS. 1 and 2 is a connector assembled to a vehicle body of a vehicle such as an electric vehicle (EV) or a plug-in hybrid electric vehicle (PHEV) equipped with a battery. When the battery of the vehicle is charged, the charging inlet 1 is fitted with a power supply connector of a power supply device (not illustrated). In a state in which the power supply connector is fitted to the charging inlet 1, power is supplied from the power supply device to the vehicle to charge the battery.

The charging inlet 1 according to the present embodiment includes a first connector portion 2, a second connector portion 3, and a plurality of signal terminals 6 and power terminals 4 installed in the first connector portion 2 and the second connector portion 3 from a rear side.

For example, a plurality of signal terminals 6 connected to signal lines 8 and a pair of power terminals 4 connected to power lines 7 are inserted and installed in the first connector portion 2. For example, a pair of power terminals connected to power lines (not illustrated) are inserted and installed in the second connector portion 3.

As illustrated in FIGS. 1 and 2, the charging inlet 1 includes a housing 20 having a plurality of terminal accommodating chambers, and a rear holder 40 that is installed in the housing 20 and supports the power lines 7 and the signal lines 8, which are electric wires respectively connected to the power terminals 4 and the signal terminals 6 that are terminals accommodated in terminal accommodating chambers 26.

The housing 20 according to the present embodiment is formed of a synthetic resin. The rear holder 40 is assembled to the housing 20 from a rear side of a portion constituting the first connector portion 2.

The housing 20 includes an attachment flange 21 having bolt holes 27 and protruding to an outer peripheral side. The charging inlet 1 is attached to the vehicle by screwing attachment bolts (not illustrated) inserted into the bolt holes 27 of the attachment flange 21 into screw holes (not illustrated) of the vehicle.

The housing 20 has a tubular shape. The housing 20 includes a partition wall 23 on a rear side in an axial direction, so that an interior thereof is partitioned into front and rear portions by the partition wall 23 (see FIG. 4). The housing 20 includes a front peripheral wall 24 on a front side of the partition wall 23 and a rear peripheral wall 25 on a rear side of the partition wall 23.

The rear holder 40 is assembled to an outer side of the rear peripheral wall 25 constituting the first connector portion 2 of the housing 20. The front peripheral wall 24 of the housing 20 is formed with fitting recesses 29 for fitting power supply connectors.

The partition wall 23 of the housing 20 is provided with the plurality of terminal accommodating chambers 26. The power terminals 4 and the signal terminals 6 are inserted into the terminal accommodating chambers 26 from a rear side of the housing 20. Each of the terminal accommodating chambers 26 is formed with a through hole 28, which has a smaller diameter than the terminal accommodating chamber 26, on a front side in an insertion direction of the power terminals 4 and the signal terminals 6. Each of the power terminals 4 and the signal terminals 6 inserted into the terminal accommodating chambers 26 includes an electric connection portion 41 inserted into the through hole 28, and a flange portion 43 abutting against a front wall of the terminal accommodating chamber 26 and restricting forward movement.

Each of the power terminals 4 is a charging terminal through which a charging current flows. The power terminal 4 is formed of a conductive metal material such as copper or a copper alloy, and is manufactured by cutting a round rod made of the conductive metal material. The power terminal 4 includes the electric connection portion 41 on a top end side to which a counterpart power terminal (not illustrated) is connected, an electric wire connection portion 42 on a rear end side to which an end portion of the power line 7 connected to the battery of the vehicle is connected, and the flange portion 43 that protrudes to an outer periphery over a circumferential direction between the electric connection portion 41 and the electric wire connection portion 42.

Each of the signal terminals 6 is a control terminal through which an electric signal flows. The signal terminal 6 is formed of a conductive metal material such as copper or a copper alloy, and is manufactured by cutting a round rod made of the conductive metal material. The signal terminal 6 includes an electric connection portion 61 on a top end side to which a counterpart signal terminal (not illustrated) is connected, an electric wire connection portion 62 on a rear end side to which an end portion of the signal line 8 connected to a control device is connected, and a flange portion 63 that protrudes to an outer periphery over an circumferential direction between the electric connection portion 61 and the electric wire connection portion 62.

The rear holder 40 includes an inner rear holder 50 and an outer rear holder 70 fitted to an outer peripheral side of the inner rear holder 50.

Figure 6:
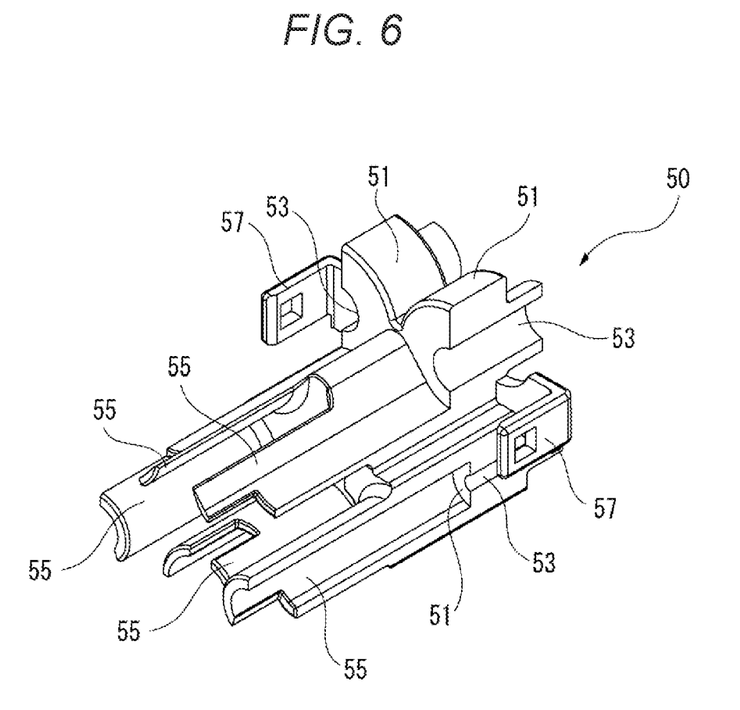
FIG. 6 is a perspective view of an inner rear holder in FIG. 5.

The inner rear holder 50 is formed of an insulating synthetic resin. As illustrated in FIGS. 5 and 6, the inner rear holder 50 is provided with, on an outer peripheral portion, a plurality of outer electric wire insertion portions 51 each having an inner electric wire support surface 53 that has a semicircular cross section facing radially outward relative to a central axis X1 of the inner rear holder 50.

The inner rear holder 50 is further provided with, on the outer peripheral portion, a plurality of terminal holding portions 55 that extend forward along the central axis X1 from the outer electric wire insertion portions 51. When the inner rear holder 50 is installed to the housing 20, top ends of the terminal holding portions 55 abut against the flange portions 43 and 63 of the power terminals 4 and the signal terminals 6 inserted into the terminal accommodating chambers 26. Therefore, the power terminals 4 and the signal terminals 6 are restricted from moving rearward.

The inner rear holder 50 is further provided with a pair of locking pieces 57 on the outer peripheral portion.

Figure 7:
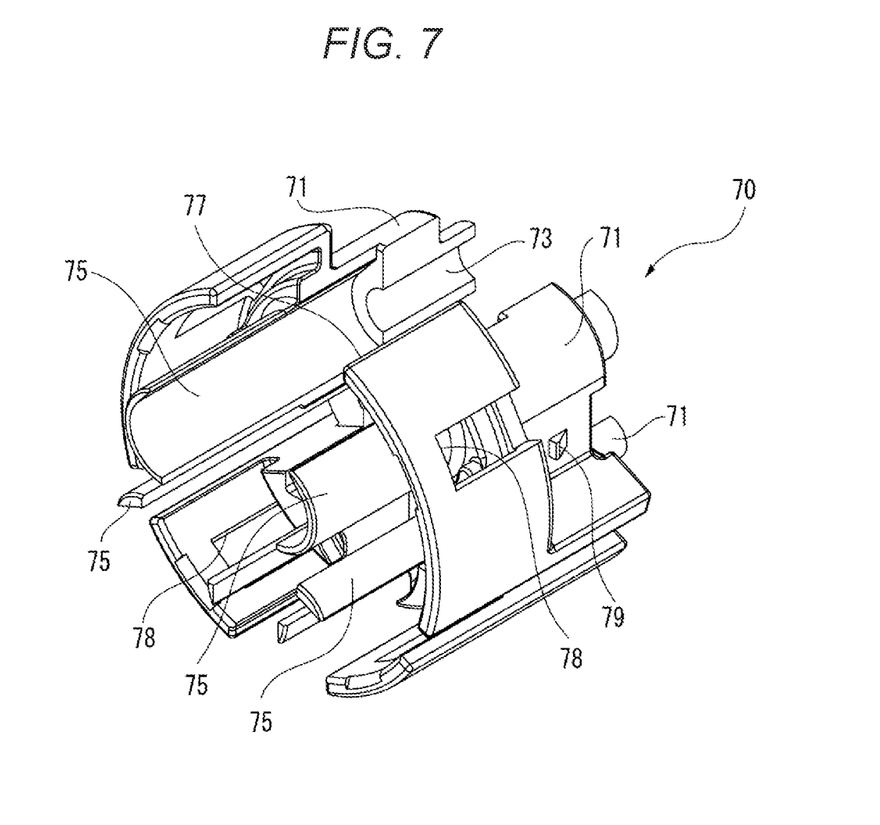
FIG. 7 is a perspective view of an outer rear holder in FIG. 5.

The outer rear holder 70 is formed of an insulating synthetic resin. As illustrated in FIGS. 5 and 7, the outer rear holder 70 is provided with, on an inner peripheral portion, a plurality of inner electric wire insertion portions 71 each having an outer electric wire support surface 73 that corresponds to the inner electric wire support surface 53 and has a semicircular cross section facing radially inward relative to a central axis X2 of the outer rear holder 70.

The outer rear holder 70 is further provided with, on the inner peripheral portion, a plurality of terminal holding portions 75 extending forward along the central axis X2 from the inner electric wire insertion portions 71. When the outer rear holder 70 is installed to the housing 20, top ends of the terminal holding portions 75 abut against the flange portions 43 and 63 of the power terminals 4 and the signal terminals 6 inserted into the terminal accommodating chambers 26. Therefore, the power terminals 4 and the signal terminals 6 are restricted from moving rearward.

The outer rear holder 70 is further provided with a pair of locking projections 79 on an outer peripheral portion.

Between the inner rear holder 50 and the outer rear holder 70 is provided a locking mechanism 60 that holds the inner rear holder 50 and the outer rear holder 70 in a fitted state by the pair of locking pieces 57 of the inner rear holder 50 and the pair of locking projections 79 of the outer rear holder 70.

In a state in which the outer rear holder 70 is fitted to the outer peripheral side of the inner rear holder 50, the outer electric wire insertion portions 51 and the inner electric wire insertion portions 71 can define insertion spaces each having a circular cross section through which the power lines 7 or the signal lines 8 are inserted by the inner electric wire support surfaces 53 and the outer electric wire support surfaces 73 as illustrated in FIG. 3.

Here, the power lines 7 or the signal lines 8 are sandwiched by the inner electric wire support surfaces 53 and the outer electric wire support surfaces 73 with all peripheries covered. The inner electric wire support surfaces 53 and the outer electric wire support surfaces 73 have a radius of curvature appropriately set in accordance with diameters of the power lines 7 or the signal lines 8.

The plurality of inner electric wire insertion portions 71 of the outer rear holder 70 communicate with an outer peripheral side of the outer rear holder 70 through a communication portion 77. The power lines 7 or the signal lines 8 can be inserted into the inner electric wire insertion portions 71 of the outer rear holder 70 through the communication portion 77, and thus it is not necessary to insert the power lines 7 or the signal lines 8 into the outer rear holder 70 in advance.

Next, an assembling procedure of the charging inlet 1 according to the present embodiment will be described.

Figure 8:
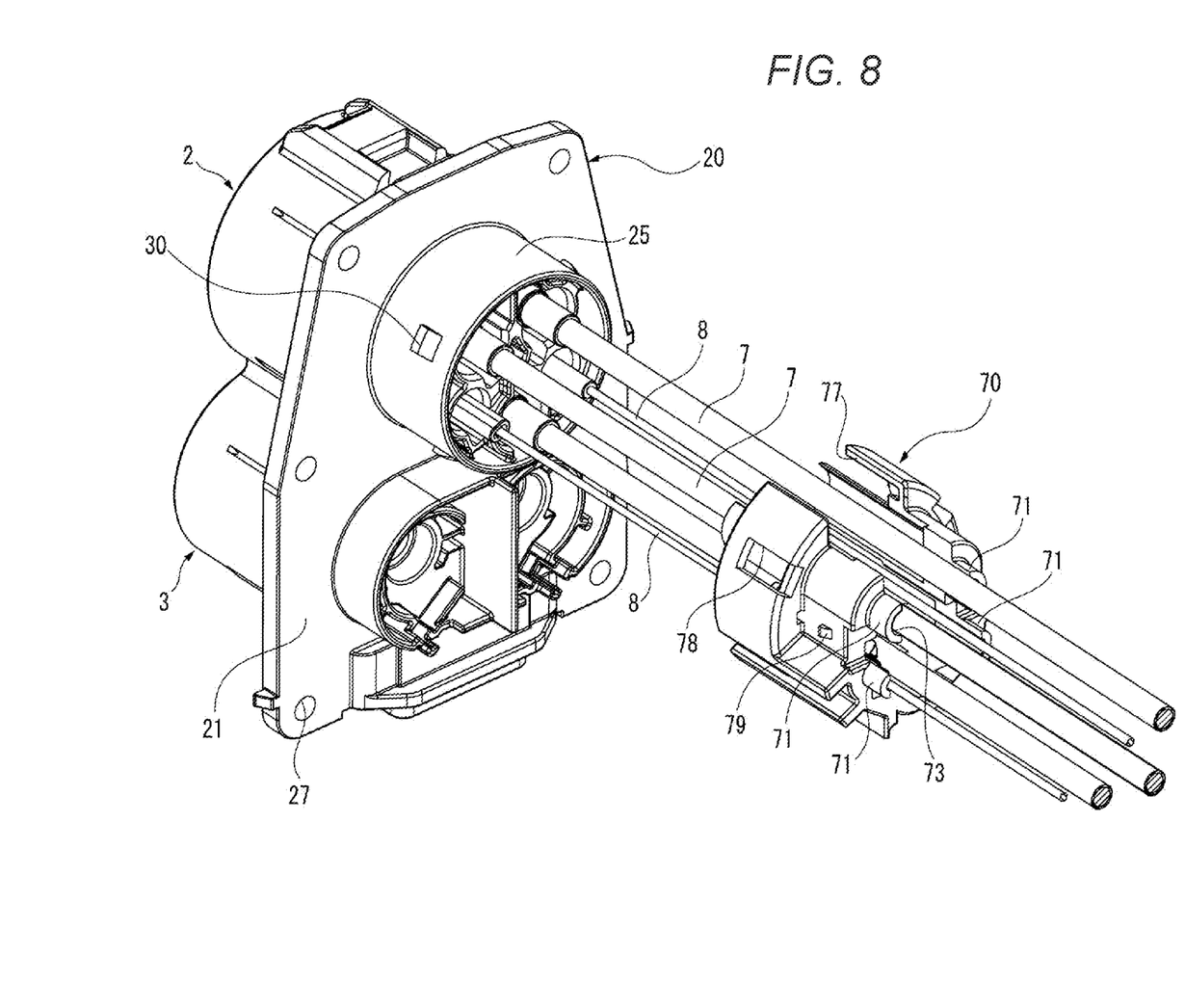
FIG. 8 is a perspective view illustrating a state in which the outer rear holder is disposed on electric wires in which terminals at end portions are accommodated in terminal accommodating chambers of a housing.

First, as illustrated in FIG. 8, the power terminals 4 and the signal terminals 6 connected to end portions of the power lines 7 and the signal lines 8 are inserted into the respective terminal accommodating chambers 26 of the housing 20 from a rear side. The power terminals 4 and the signal terminals 6 inserted into the terminal accommodating chambers 26 are prevented from moving forward since the flange portions 43 and 63 abut against the front walls of the terminal accommodating chambers 26.

Figure 9:
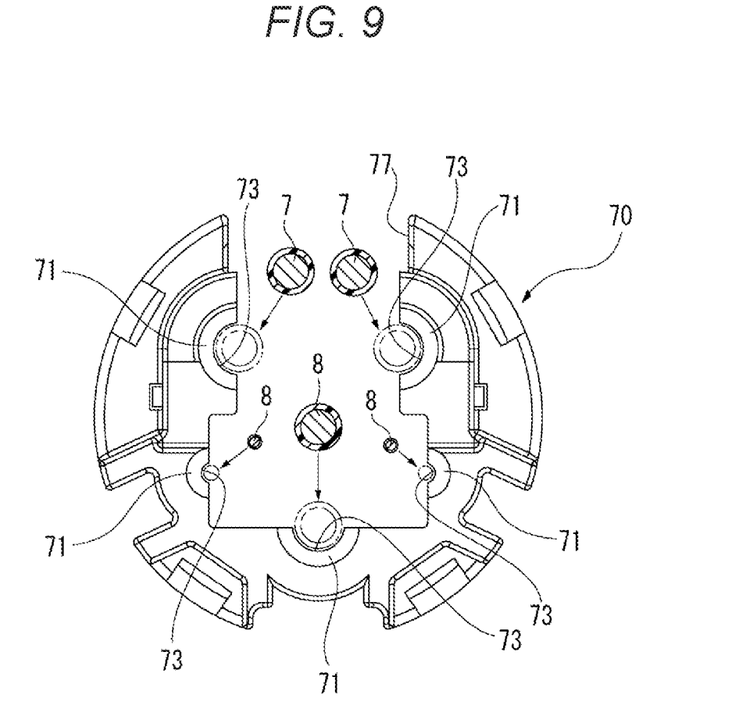
FIG. 9 is a back view of the outer rear holder in FIG. 8 viewed from a rear side.

As illustrated in FIGS. 8 and 9, the power lines 7 and the signal lines 8 are inserted into an inner peripheral side of the outer rear holder 70 through the communication portion 77, and are arranged along the outer electric wire support surfaces 73 of the plurality of inner electric wire insertion portions 71.

Figure 10:
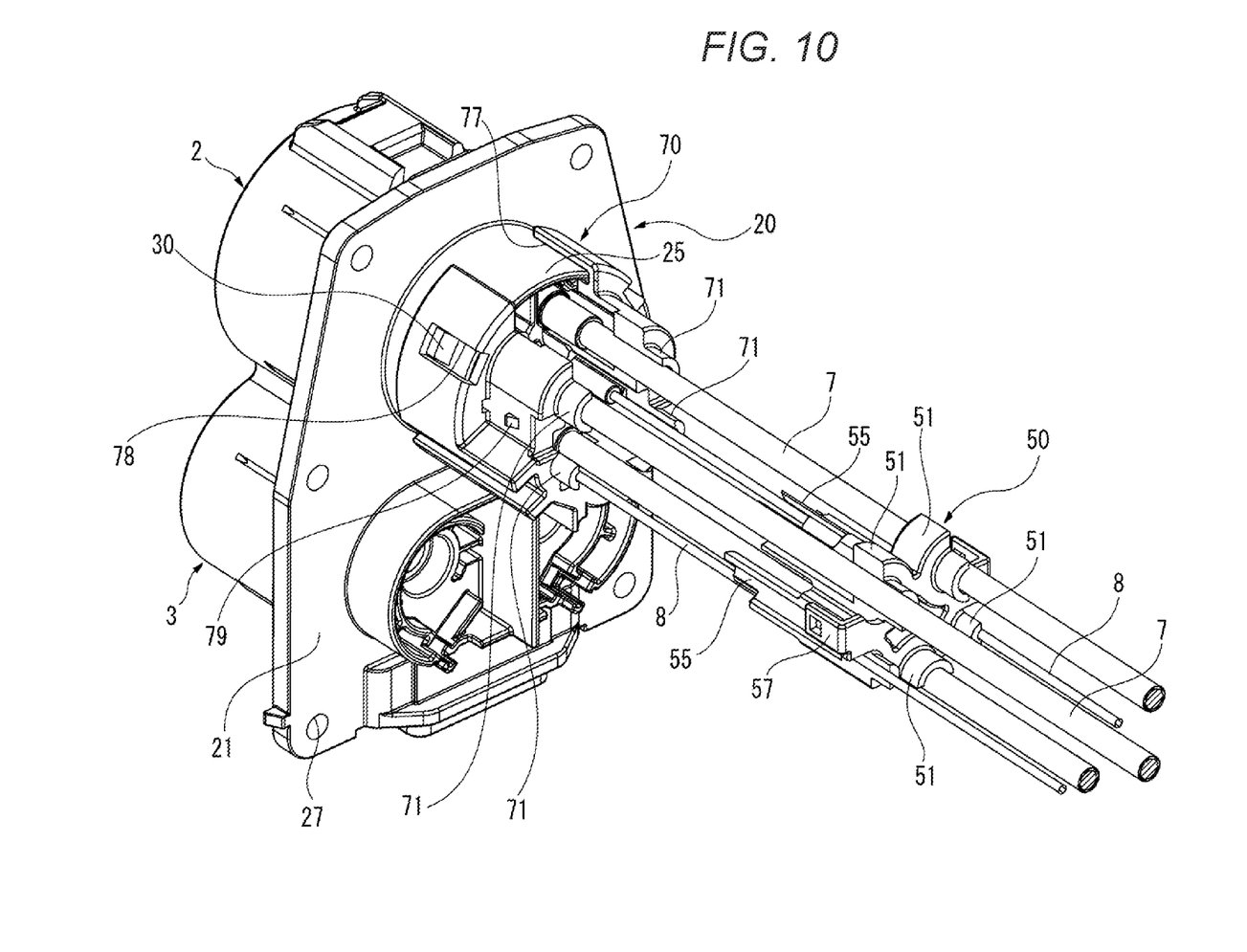
FIG. 10 is a perspective view illustrating a state in which an inner rear holder is disposed on the electric wires after the outer rear holder is installed in the housing.

As illustrated in FIG. 10, the outer rear holder 70 is moved toward the housing 20 and is installed to the rear peripheral wall 25 of the housing 20 by locking locking holes 78 of the outer rear holder 70 to lock projections 30.

Figure 11:
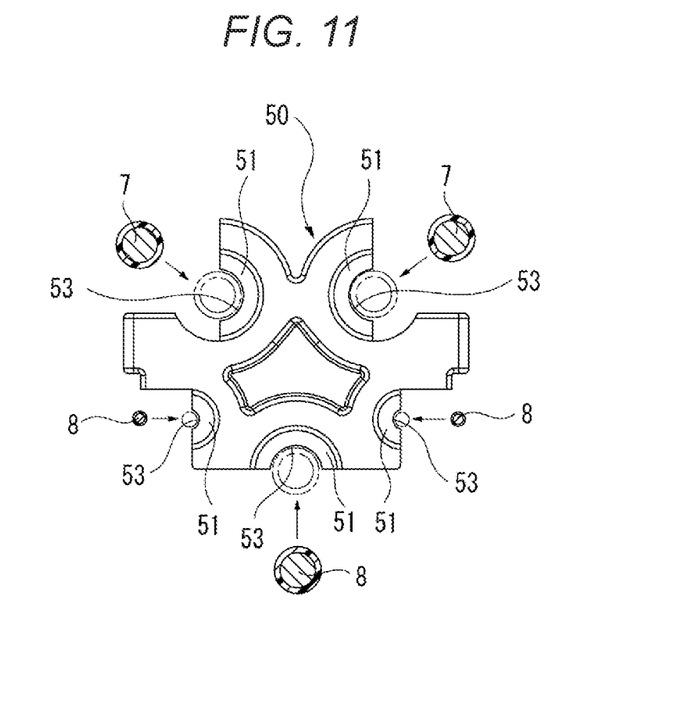
FIG. 11 is a back view of the inner rear holder in FIG. 10 viewed from a rear side.

Next, as illustrated in FIGS. 10 and 11, the power lines 7 and the signal lines 8 are arranged along the inner electric wire support surfaces 53 of the plurality of outer electric wire insertion portions 51 provided on the outer peripheral portion of the inner rear holder 50.

Further, the inner rear holder 50 is moved toward the housing 20, and is installed to the rear peripheral wall 25 of the housing 20 by locking the pair of locking pieces 57 of the inner rear holder 50 to the pair of locking projections 79 of the outer rear holder 70 (see FIG. 2).

In the state in which the outer rear holder 70 is fitted to the outer peripheral side of the inner rear holder 50, as illustrated in FIGS. 2 and 3, the power lines 7 or the signal lines 8 are sandwiched by the inner electric wire support surfaces 53 and the outer electric wire support surfaces 73 with all peripheries covered.

Therefore, even when an external force is applied to the power lines 7 or the signal lines 8, the power lines 7 or the signal lines 8 can be prevented from being shaken in the terminal accommodating chambers 26, and the power terminals 4 and the signal terminals 6 connected to ends of the power lines 7 or the signal lines 8 can be prevented from being shaken in conjunction. For this reason, the alignment of terminal top ends would not be affected.

Therefore, according to the charging inlet 1 in the present embodiment, the shaking of the terminal top ends of the power terminals 4 and the signal terminals 6 accommodated in the housing 20 can be prevented and the alignment can be improved, and the workability of fitting with a counterpart connector can be improved.

The present invention is not limited to the above-described embodiment and can be appropriately modified, improved and the like. Materials, shapes, sizes, numbers, arrangement positions, and the like of components in the above-described embodiment are freely selected and are not limited as long as the present invention can be implemented.

Here, features of the embodiment of the connector according to the present invention described above will be briefly summarized and listed below. [1] A connector (charging inlet 1) including:
a housing (20) having a plurality of terminal accommodating chambers (26) into which terminals (power terminals 4, signal terminals 6) are inserted; and
a rear holder (40) installed to the housing (20) and supporting electric wires (power lines 7, signal lines 8) connected to the terminals (power terminals 4, signal terminals 6) accommodated in the respective plurality of terminal accommodating chambers (26), wherein
the rear holder (40) includes an inner rear holder (50) and an outer rear holder (70) fitted to an outer peripheral side of the inner rear holder (50),
the inner rear holder (50) is provided with, on an outer peripheral portion, a plurality of outer electric wire insertion portions (51) each having an inner electric wire support surface (53) that has a semicircular cross section facing outward,
the outer rear holder (70) is provided with, on an inner peripheral portion, a plurality of inner electric wire insertion portions (71) each having an outer electric wire support surface (73) that corresponds to the inner electric wire support surface (53) and has a semicircular cross section facing inward,
the plurality of inner electric wire insertion portions (71) communicates with an outer peripheral side of the outer rear holder (70) through a communication portion (77), and
the electric wires (power lines 7, signal lines 8) are sandwiched between the inner electric wire support surfaces (53) and the outer electric wire support surfaces (73).

[2] The connector (charging inlet 1) according to [1], wherein each of the inner rear holder (50) and the outer rear holder (70) includes terminal holding portions (55, 75) that restrict rearward movement of the terminals (power terminals 4, signal terminals 6) inserted into the terminal accommodating chambers (26).

[3] The connector (charging inlet 1) according to [1] or [2], wherein a locking mechanism (60) that maintains a fitted state is provided between the inner rear holder (50) and the outer rear holder (70).

What is claimed is:
1. A connector comprising:
a housing having a plurality of terminal accommodating chambers into which terminals are inserted; and
a rear holder installed to the housing and supporting electric wires connected to the terminals accommodated in the respective plurality of terminal accommodating chambers, wherein
the rear holder includes an inner rear holder and an outer rear holder fitted to an outer peripheral side of the inner rear holder,
the inner rear holder is provided with, on an outer peripheral portion, a plurality of outer electric wire insertion portions each having an inner electric wire support surface that has a semicircular cross section facing outward,
the outer rear holder is provided with, on an inner peripheral portion, a plurality of inner electric wire insertion portions each having an outer electric wire support surface that corresponds to the inner electric wire support surface and has a semicircular cross section facing inward,
the plurality of inner electric wire insertion portions communicates with an outer peripheral side of the outer rear holder through a communication portion, and
the electric wires are sandwiched between the inner electric wire support surfaces and the outer electric wire support surfaces.

2. The connector according to claim 1, wherein
each of the inner rear holder and the outer rear holder includes a terminal holding portion that restricts rearward movement of each of the terminals inserted into the terminal accommodating chambers.

3. The connector according to claim 1, wherein
a locking mechanism that maintains a fitted state is provided between the inner rear holder and the outer rear holder.

\* \* \* \* \*